US012691548B2

(12) United States Patent
　　 Piche

(10) Patent No.: US 12,691,548 B2
(45) Date of Patent: Jul. 28, 2026

(54) METHODS FOR COMPENSATING FOR CRYSTAL STRUCTURE DIFFERENTIAL MATERIAL REMOVAL RATES IN SUB-APERTURE FIGURING PROCESSES

(71) Applicant: CORNING INCORPORATED, Corning, NY (US)

(72) Inventor: Francois Piche, Rochester, NY (US)

(73) Assignee: CORNING INCORPORATED, Corning, NY (US)

( * ) Notice: Subject to any disclaimer, the term of this patent is extended or adjusted under 35 U.S.C. 154(b) by 1097 days.

(21) Appl. No.: 17/484,548

(22) Filed: Sep. 24, 2021

(65) Prior Publication Data

US 2022/0111487 A1 Apr. 14, 2022

Related U.S. Application Data

(60) Provisional application No. 63/089,245, filed on Oct. 8, 2020.

(51) Int. Cl.
　 *B24B 49/12* (2006.01)
　 *B24B 49/04* (2006.01)
　　　　(Continued)

(52) U.S. Cl.
　 CPC ............ *B24B 49/12* (2013.01); *B24B 49/045* (2013.01); *B28D 5/0064* (2013.01); *B28D 7/005* (2013.01);
　　　　(Continued)

(58) Field of Classification Search
　 CPC ....... B24B 49/12; B24B 49/045; B24B 49/02; B24B 49/04; B24B 1/00; B24B 51/00;
　　　　(Continued)

(56) References Cited

U.S. PATENT DOCUMENTS 4,789,931 A * 12/1988 Kuragano .......... G05B 19/4099
　　　　　　　　　　　　　　　　　　700/193
5,816,896 A * 10/1998 Schouwenaars ........ B24B 49/12
　　　　　　　　　　　　　　　　　　451/10
　　　　　(Continued)

FOREIGN PATENT DOCUMENTS

CN　　　102896558 A　　1/2013
CN　　　109483365 A　　3/2019
　　　　　(Continued)

OTHER PUBLICATIONS

International Search Report and Written Opinion of the International Searching Authority; PCT/US2021/052621; dated Jan. 20, 2022; 12 pages; European Patent Office.
　　　　　(Continued)

*Primary Examiner* — Michael A Gump
(74) *Attorney, Agent, or Firm* — Kevin L. Bray; Ye Eun Park

(57) ABSTRACT

The disclosure relates to methods for compensating for crystal structures differential material removal rates in sub-aperture figuring. A computing machine receives an input related to a substrate crystal structure. The computing machine generates, based on the input, a surface map data capturing the substrate crystal structure. The computing machine generates, based on the surface map data structure, a figuring route data structure for a figuring tool to figure an optical surface on the crystal substrate. The computing machine controls, using the processing circuitry and based on the figuring route data structure, the figuring tool to figure the substrate crystal optical surface.

9 Claims, 9 Drawing Sheets

(51) Int. Cl.

| | |
|---|---|
| *B28D 5/00* | (2006.01) |
| *B28D 7/00* | (2006.01) |
| *G01B 5/20* | (2006.01) |
| *G01B 11/245* | (2006.01) |
| *G02B 3/00* | (2006.01) |

(52) U.S. Cl.
CPC .............. *G01B 5/20* (2013.01); *G01B 11/245* (2013.01); *G02B 3/0012* (2013.01)

(58) Field of Classification Search
CPC . B24B 13/06; B24B 13/0012; B24B 13/0031; B24B 13/0037; B24B 13/005; B24B 13/0055; B24B 13/04; B24B 7/22; B24B 9/14; B24B 9/148; B24B 9/16; B24B 9/163; B24B 9/164; B24B 9/165; B24B 9/167; B24B 9/168; B24B 9/169; B24B 11/00; B24B 11/02; B24B 11/04; B24B 11/06; B24B 11/08; B24B 11/10; G01B 5/20; G01B 11/245; G02B 1/005; G02B 2207/101; G02B 3/0012; G02B 3/02; B28D 5/0058; B28D 5/0064; B28D 5/0082; B28D 5/021; B28D 5/022; B28D 5/04; B28D 7/005
USPC .......... 451/6, 5, 41, 42, 43, 390; 125/30.01, 125/901
See application file for complete search history.

(56) References Cited

U.S. PATENT DOCUMENTS

| | | | |
|---|---|---|---|
| 6,375,551 | B1 | 4/2002 | Darcangelo et al. |
| 2005/0170748 | A1* | 8/2005 | Enkisch .............. G03F 7/70966 |
| | | | 451/41 |
| 2006/0102854 | A1* | 5/2006 | Neogi .................... G21K 1/093 |
| | | | 250/492.1 |
| 2015/0090245 | A1* | 4/2015 | Highfill ................ B28D 5/0058 |
| | | | 125/30.01 |
| 2018/0094972 | A1* | 4/2018 | Kojo ..................... G01J 1/4257 |
| 2018/0203432 | A1* | 7/2018 | Walker .............. G05B 19/4099 |
| 2019/0353477 | A1* | 11/2019 | Zheng .................... G06T 7/586 |

FOREIGN PATENT DOCUMENTS

| | | | |
|---|---|---|---|
| EP | 1409198 | A1 | 4/2004 |
| EP | 2461942 | A1 | 6/2012 |
| JP | 4185381 | B2 | 11/2008 |
| JP | 4391072 | B2 | 12/2009 |
| KR | 10-1748084 | B1 | 6/2017 |
| WO | 01/53038 | A1 | 7/2001 |
| WO | 2011/017266 | A1 | 2/2011 |

OTHER PUBLICATIONS

Liao et al., "Influence of material removal programming on ion beam figuring of high-precision optical surfaces", Optical Engineering, vol. 53, No. 9, 2014, 9 pages.

Wu et al., "Research on material removal accuracy analysis and correction of removal function during ion beam figuring", Optical Engineering, vol. 55, No. 9, 2016, 10 pages.

* cited by examiner

Surface R1 = 97.00 mm          Surface R2 = 70.05 mm

<u>700</u>

Receive an input related to a substrate crystal — 710

Generate a surface map data structure for the substrate crystal — 720

Generate a figuring route data structure for a figuring tool to figure the substrate crystal — 730

Control the figuring tool to figure the substrate crystal — 740

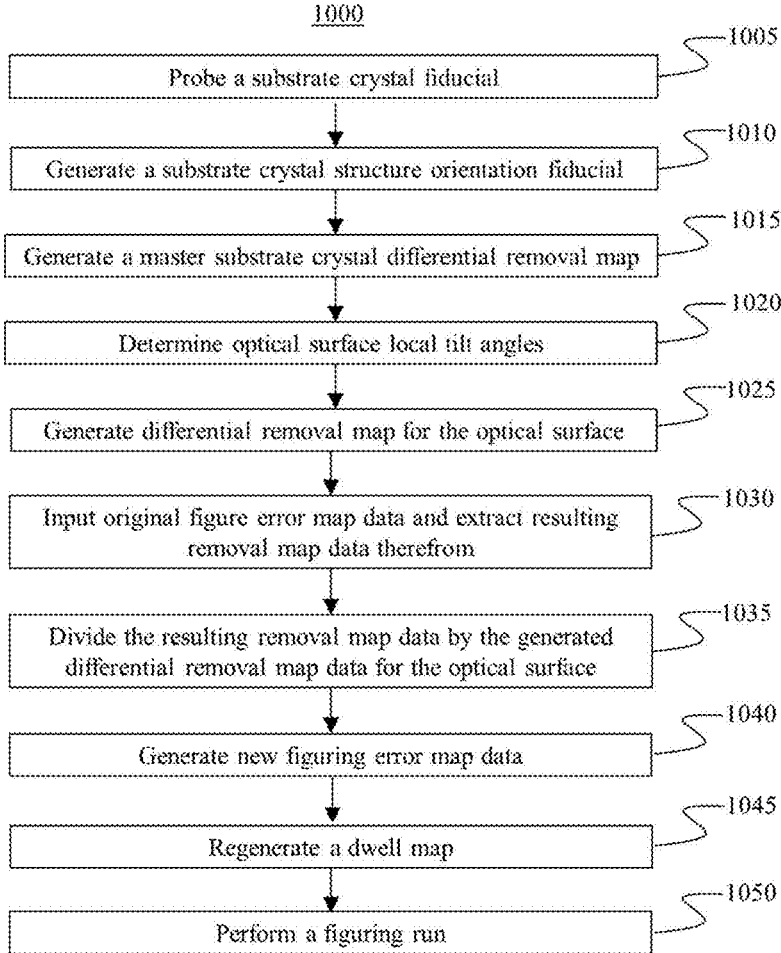

1000

Probe a substrate crystal fiducial — 1005

Generate a substrate crystal structure orientation fiducial — 1010

Generate a master substrate crystal differential removal map — 1015

Determine optical surface local tilt angles — 1020

Generate differential removal map for the optical surface — 1025

Input original figure error map data and extract resulting removal map data therefrom — 1030

Divide the resulting removal map data by the generated differential removal map data for the optical surface — 1035

Generate new figuring error map data — 1040

Regenerate a dwell map — 1045

Perform a figuring run — 1050

FIG. 10

METHODS FOR COMPENSATING FOR CRYSTAL STRUCTURE DIFFERENTIAL MATERIAL REMOVAL RATES IN SUB-APERTURE FIGURING PROCESSES

This Application claims priority under 35 USC § 119(e) from U.S. Provisional Patent Application Ser. No. 63/089, 245 filed on Oct. 8, 2020 which is incorporated by reference herein in its entirety.

BACKGROUND

In currently implemented sub-aperture figuring processes of optics, the speed at which the polishing tool is moved across the optical surface is calculated by an algorithm to reduce figure error. However, techniques for compensating for crystal structure differential removal rates in sub-aperture figuring processes may be desirable.

SUMMARY

Based on the foregoing, a sub-aperture figuring process for a non-isotropic optical substrate is desirable. The process may be based on physical principles, rather than empirical ad hoc trials and errors. Further, the process may be insensitive to the particulars of the degree of material removal rate variation of the polishing process and the characteristics of an incoming figure error to be corrected.

Aspects described herein relate to such a process. Some aspects provide a sub-aperture figuring method that accounts for the spatial differential in material removal rate for non-isotropic, crystalline optical substrates. Some schemes take the approach of optimizing the slurry chemicals and restricting the polishing tools for crystal substrate figuring to those that have a minimum, tolerable amount of differential material removal over the surface of a crystal substrate non-flat lens surface. The scheme disclosed herein lifts this restriction, thus allowing for greater flexibility in the use of polishing slurries for sub-aperture figuring processes of crystalline substrates.

BRIEF DESCRIPTION OF THE DRAWINGS

The drawings illustrate generally, by way of example, but not by way of limitation, various embodiments discussed herein.

FIG. 10 is a flow chart of a fourth method for compensating for crystal structures differential material removal rates in sub-aperture figuring processes, in accordance with some embodiments.

Figure 1:
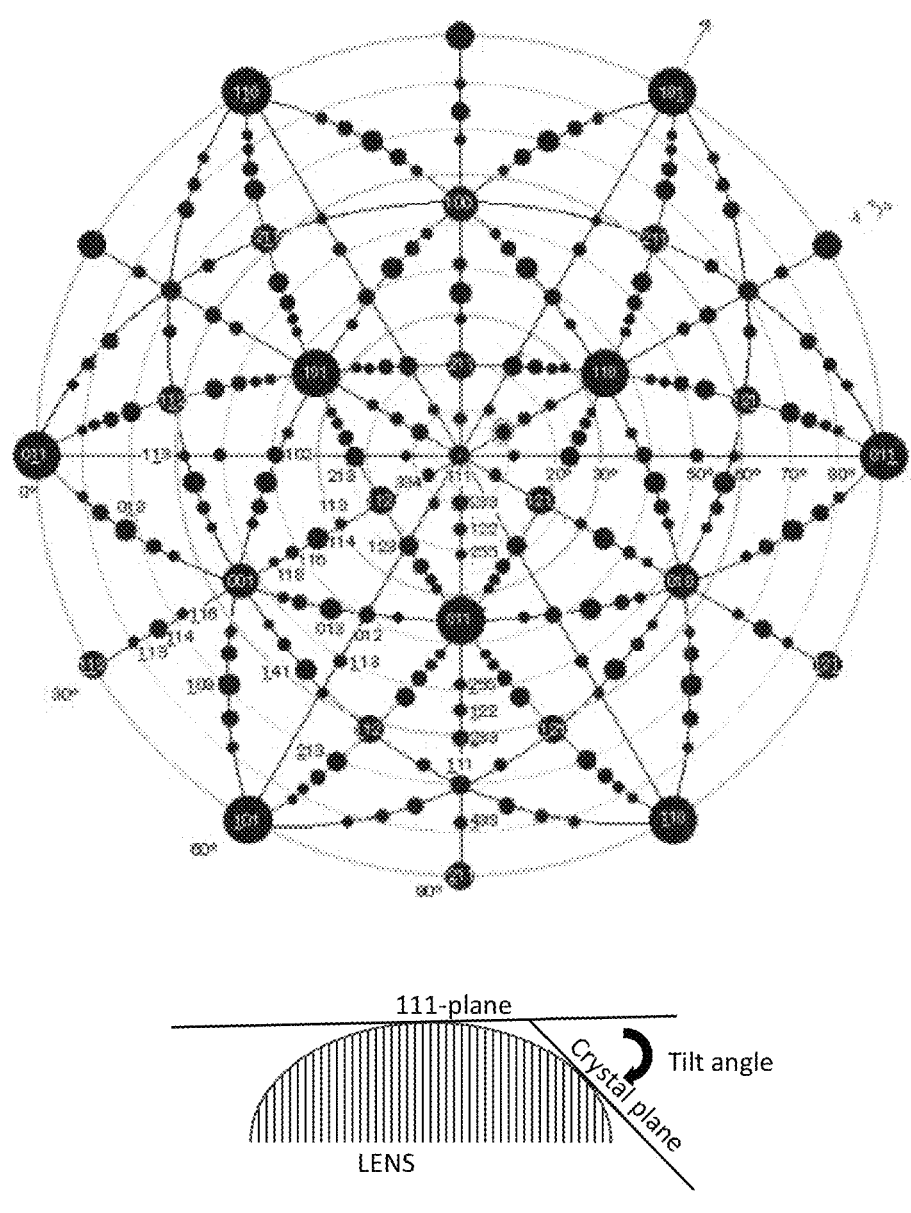
FIG. 1 is a diagram of the distribution of crystal plane orientation over a hemispherical surface for $CaF_2$ crystal, in accordance with some embodiments.

Repeated use of reference characters in the specification and drawings is intended to represent the same or analogous features or elements of the disclosure, even when the numbers increase by 100 from figure-to-figure. Numerous other modifications and examples can be devised by those skilled in the art, which fall within the scope and spirit of the principles of the disclosure.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In currently-implemented sub-aperture figuring processes of optics, the speed at which the polishing tool is moved across the optical surface is calculated by an algorithm to reduce figure error (e.g., deviations from the desired perfect shape) using knowledge of the figure error to correct, the rate at which the tool removes material, and the footprint (surface area of contact) of the polishing tool when in contact with the optical surface being polished. Current state-of-the-art sub-aperture figuring process works if the following underlying assumptions are met:

1. The tool material removal rate is constant across the entire surface. This breaks down into two sub-assumptions:
   a. Spatial constancy: The tool material removal rate is insensitive to the tool location on the optical surface being polished
   b. Temporal constancy: The tool material removal rate does not change with time.
2. The tool footprint with the optical surface is constant as the tool is moved across the optical surface.

More sophisticated sub-aperture figuring process software algorithms designed to process optics with aspherical and freeform surfaces that can accommodate violation of assumption 2 are available and permit figure processing with a non-constant tool footprint by modeling the footprint at the polishing tool/optical surface interface from knowledge of the local optical surface geometry and the mechanical characteristics of the polishing tool. This process is sometimes called spot morphing. Examples of such commercially available processes include, but are not limited to QED Technologies MRF®, OptiPro UFF, Satisloh ADAPT, and Zeeko Precession™.

Some work has gone into ensuring satisfaction of condition 1*b*—temporal constancy—by using or developing polishing media and slurries that have stable removal rates over time. However, currently-implemented figure processes assume, without verifying, that condition 1*a*—spatial constancy—is satisfied and that the rate of removal of material is constant across the optical surface during figuring. While the assumption of spatial constancy may be valid for a homogeneous and isotropic material (e.g. a non-crystalline material), it is invalid for anisotropic crystalline materials for which the material removal rate during figure processing varies with crystallographic orientation. No attempt has been made in the prior art to explicitly account for variations in the rate of material removal across the optical surface of anisotropic crystals due to variations in crystallographic orientation of the optical surface at the contact point of the tool with the optical surface.

For example, even when advanced sub-aperture figuring processes are used, such processes might only yield acceptable results under a narrow set of conditions of the figure error to be corrected. An example of such a restrictive set of conditions is a figure error correlated with the underlying crystal structure that results from conventional diamond abrasive full aperture spherical pitch polishing coupled with a given amount of material to be uniformly removed over the entire optical surface as part of the sub-aperture figuring run. Both of those conditions are unlikely to be met, for example, by any prior sub-aperture figuring process on aspheric or freeform surfaces. Even on spherical CaF$_2$ surfaces, prepared with conventional diamond pitch polishing, a successful outcome is not guaranteed.

The disclosure generally relates to a method for compensating for differential material removal rates caused by variations in crystallographic orientation along the optical surface in sub-aperture figuring of anisotropic crystals. Instead of assuming a uniform rate of removal irrespective of crystallographic orientation, the present methods explicitly account for variations in the rate of material removal associated with differences in crystallographic orientation across the optical surface to provide figuring processes with enhanced figure error correction capability. But before one delves into the significant advantages that the methods claimed herein, it is instructive to first discuss how existing methods fail.

Introduction

Crystalline optical substrates, such as CaF$_2$, have a rate of material removal in figure processing that depends on the crystal orientation of the surface being polished. Crystalline materials normally have non-isotropic hardness and non-isotropic fracture toughness and thus will abrade at different rates under polishing action depending on the atomic structure of the optical surface being presented to the polishing tool at the point of contact of the polishing tool with the optical surface. This means that, for non-isotropic substrate, the current sub-aperture figuring process assumption of spatial constancy of the material removal rate is violated.

The processes described in the art to date assume that the tool footprint and tool removal rate is constant over the entire optical surface. The former condition is true for a spherical surface and the latter condition is true for an isotropic and homogeneous substrate material. In the case of aspherical and freeform surfaces, where the local geometry (and hence, tool footprint) presented to the polishing tool differs over the optical surface, a process called spot morphing is applied to modify the measured or modeled tool footprint to take into consideration the changing geometry at the polishing interface over the optical surface. This modification to the sub-aperture process flow is already implemented in most commercial advanced sub-aperture software package (QED MRF®, Zeeko Precession™, Satisloh ADAPT).

The degree of spatial variability in the material removal rate of a particular polishing process can have direct adverse effect on the figure convergence and determinism of the sub-aperture figuring process. Figure convergence is the rate at which the figure error to be corrected is corrected, and determinism is the degree of agreement between what the process delivers and what the process predicts it will deliver as calculated by the sub-aperture polishing software algorithm. The greater the variability of the material removal rate, the more degraded will be the ability of the sub-aperture figuring process to make high-precision optical surfaces. This is especially problematic for DUV and VUV optics since the anisotropic crystalline substrates CaF$_2$ and MgF$_2$ are some of the few remaining transparent materials available (in conjunction with fused silica) to achieve color correction in lithographic lens systems.

FIG. 1 is a diagram of the distribution of crystal plane orientation over a hemispherical surface for CaF$_2$ crystal. Crystal plane orientation is also referred to herein as "crystallographic orientation". FIG. 1 is the polar representation of the crystal structure of a hemispherical CaF$_2$ optical surface with the (111) plane located at the center of the hemisphere. Azimuth are defined with respect to the (011) plane going around counterclockwise (CCW). The concentric circles centered about the 111-plane are labeled with the local surface tilt angle away from to the (111) plane. This tilt angle is further illustrated in a side view of the surface shown at the bottom FIG. 1. This tilt angle and the azimuth angle will be referred collectively as the tilt angles data throughout the rest of this document. Various crystal planes are labeled.

Figure 2:
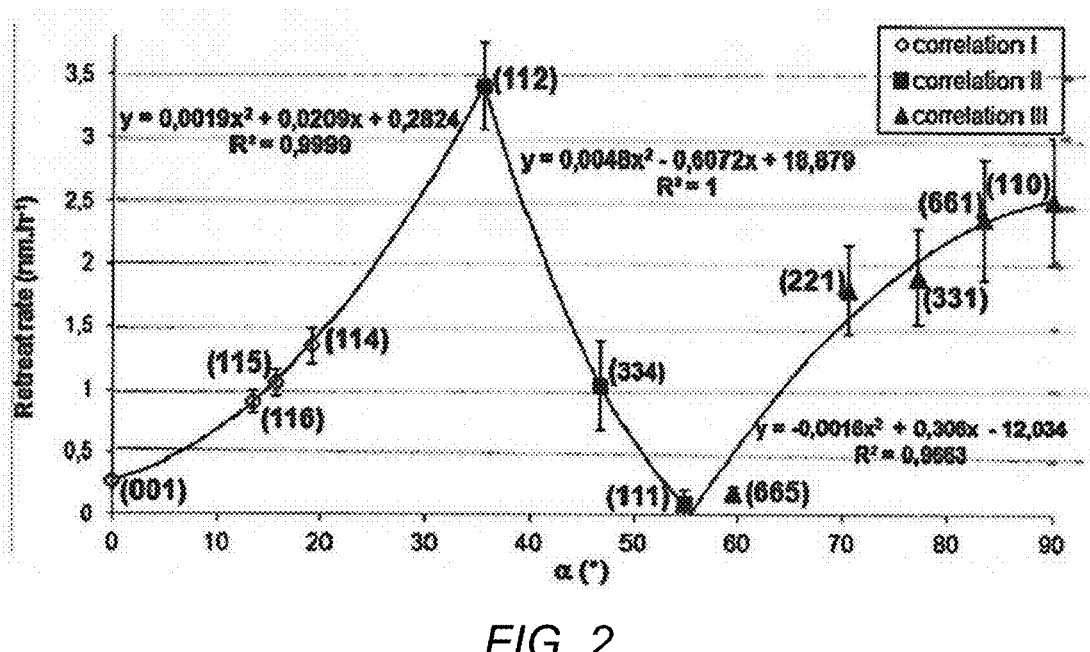
FIG. 2 is a plot of removal rate as a function of crystal plane, in accordance with some embodiments.
Figure 3:
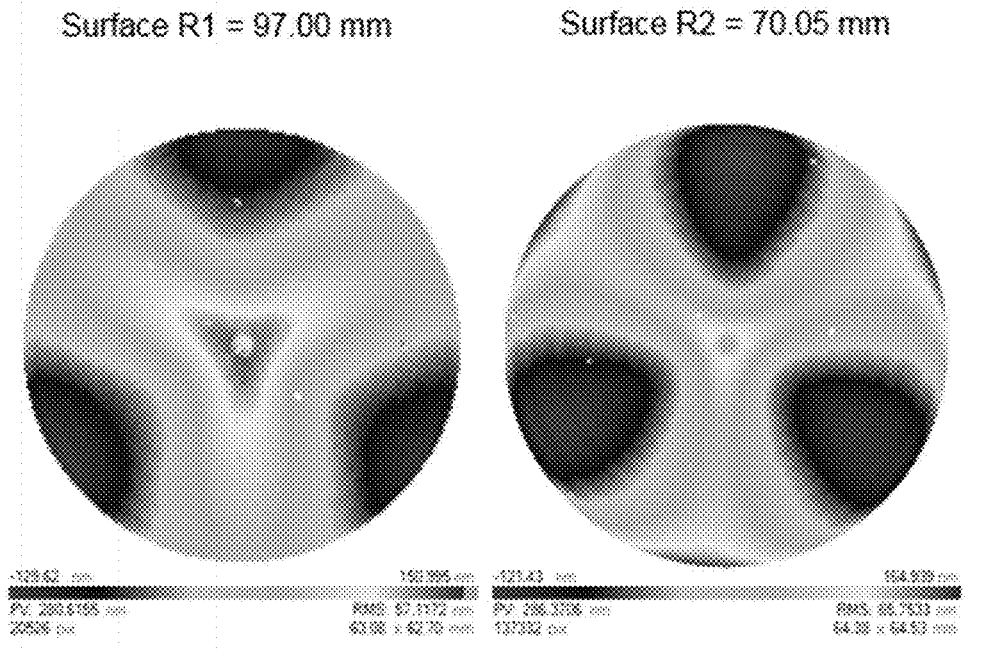
FIG. 3 is an image of how a $CaF_2$ surface figure changes when performing a 200 nm "uniform" removal with a cerium-oxide slurry on both surfaces of a lens, using a current state of the art sub-aperture figuring process.

FIG. 2 is a plot of removal rate as a function of crystallographic orientation. In this case, from a long term (<50 hours) experimental dissolution rate (0.05 M NaClO$_4$/ HClO$_4$ at pH of 3.6) measured by Godinho et al. *Geochim. Et Cosmochim. Acta* 86: 392 (2012). While etching is a different material removal mechanism than polishing, it illustrates the phenomenon of significant changes in material removal rates for different CaF$_2$ crystal planes. Such differences in material removal rate with crystallographic orientation, if unaccounted for, lead to large figure errors in polished optical surfaces FIG. 3 is an image of opposing CaF$_2$ surfaces of a bi-convex spherical lens obtained after performing a 200 nm uniform removal with a sub-aperture figuring process using a cerium-oxide slurry according to the prior art. The surfaces polished had shapes with regions with tilt angles that spanned 0°-21° and 0°-30° from the [111]-plane for surface R1 (left) and surface R2 (right), respectively. The range of tilt angles means that the polishing tool encounters a multitude of crystallographic orientations as it passes across the optical surface and as a result, that the rate of material removal varies across the optical surface. The "uniform" removal predicted by the sub-aperture process algorithm of the prior art differs drastically from the actual results showing approximately twice as much material removal from the [112]-plane than from the [111]-plane, as evidenced by the low areas (dark areas in the images) observed in the images. Images of the type shown in FIG. 3 are referred to herein as surface figure error maps.

Figure 4:
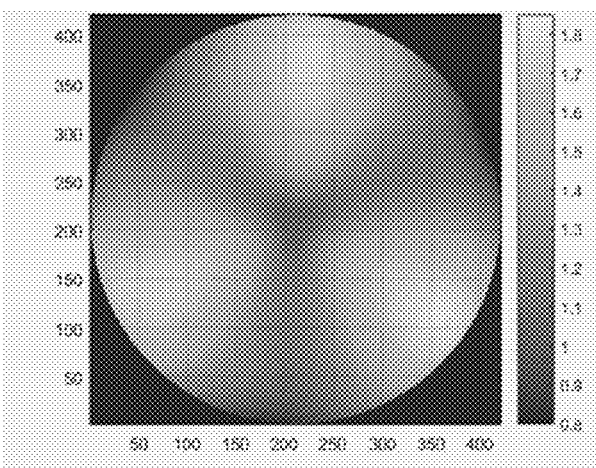
FIG. 4 is an image of the relative rate of material removal with the cerium-oxide-based slurry on a spherical $CaF_2$ surface with the (111) crystal plane at the center.

FIG. 4 is an image of a $CaF_2$ differential material removal rate (DMRR) map for the surface R2 of FIG. 3. The DMRR maps were calculated from that surface figure error map. The DMRR maps were calculated by taking the inverse of the figure error map and fitting the first 36 Zernike polynomials to the inverse of the figure error data. The map was then offset in piston to set the material removal at the center [111]-plane at 200 nm, the amount of uniform removal (UR) requested when generating the figure error map shown in FIG. 3 surface R2. The DMRR was then calculated by dividing the map by 200 nm, the thickness of material removed at the [111]-plane normalization location. The DMMR map is the ratio of the material removal rate from arbitrary crystal planes relative to a reference crystal plane in the crystal (here the [111]-plane in $CaF_2$).

Once one obtains a map of the inverse of surface figure error, one can fit the map of the inverse of surface figure error with the first 36 Zernike polynomials. This is because, in practice, the removal rate gradually changes with tool angle. The fit is meant to capture a global trend in the image and discard "noise" in the data so that one obtains a continuous, smooth DMRR map. Zernike polynomials are a common way to fit two dimensional functions on a circular map data, looking at how the surface changes upon uniform removal and harnessing that information to calculate removal rate ratios between two different orientations on an optical surface.

Figure 5:
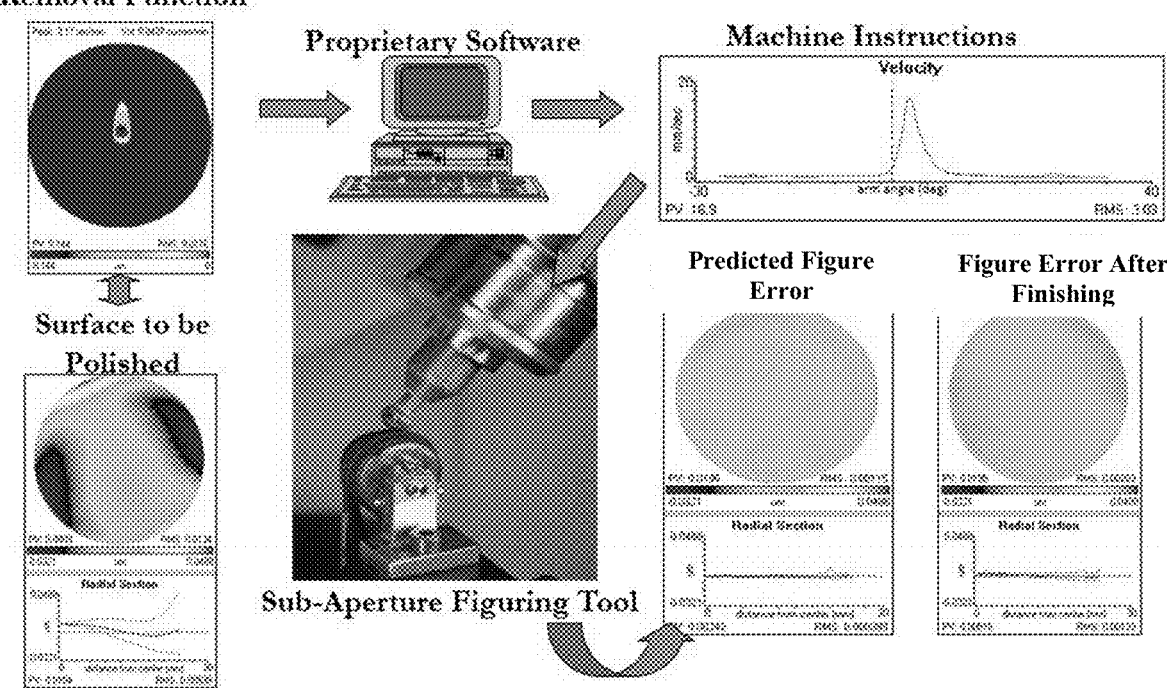
FIG. 5 is a diagram showing the information and processing flow of a state-of-the-art sub-aperture figuring process, in accordance with some embodiments.

FIG. 5 is a diagram showing the information and processing flow of a standard sub-aperture figuring process for an optical element. The optical element has an optical surface with an initial error in figure that requires correction. Information about the tool removal footprint and rate of material removal (Polishing Tool Removal Function also called Tool Influence Function) is combined with the figure error as input to a software algorithm to generate a dwell map. A dwell map is a map of the time of contact of the polishing tool at each position of the optical surface needed to remove or reduce the initial error in surface figure. The dwell map is converted into control instructions for a computer numerical controlled (CNC) polishing machine, which then processes the optical surface to correct the error in figure. The set of CNC instructions is also called a figuring route data structure in this document. The software algorithm, also referred to as a "solver" in this document, generates a prediction of the figure error expected after the figuring run (Predicted Figure Error). The CNC instructions are then executed by the CNC polishing machine to correct the figure error on the optical surface. The process delivers the optical surface with a corrected figure (Figure Error After Finishing). The process is iterated as necessary until figure specifications are met. Current commercial software algorithms include, but is not limited to, QED Technologies MRF®, Zeeko Precession™, Satisloh ADAPT, OptiPro UFF, and other and in-house CCOS (Computer Controlled Optical Surfacing) software packages used by various high-end optics companies.

One of the challenges in manufacturing high-precision optics with non-isotropic optical substrate material is obtaining good figure on the optical surface while using sub-aperture figuring technologies. This goal is especially challenging for deep ultraviolet (DUV) and vacuum ultraviolet (VUV) precision optics (PO) systems using $CaF_2$ refractive optical elements. At those short wavelengths, the choice of refractive optical substrates for color correction of optical system designs is limited to a few materials, notably $CaF_2$ and $MgF_2$. Both materials are crystalline and exhibit material removal rates that vary with crystallographic orientation.

FIG. 1 shows the distribution of crystal planes orientation over a hemispherical surface for $CaF_2$ crystal. The apex of $CaF_2$ lenses is often chosen to coincide with the [111]-plane of the crystal substrate. Therefore, FIG. 1 can be viewed as a top down view onto the spherical lens surface in spherical coordinates $(\phi, \theta)$ and shows the multitude of crystal planes potentially present along the optical surface during figure polishing. A side view is also shown at the bottom of the figure.

In the case of flat optics, the polishing process interacts only with a single crystal plane and the process is insensitive to the material non-isotropic mechanical/thermal/chemical properties as only one plane is presented to the polishing tool. However, when spherical, aspheric and freeform optical surfaces are manufactured, the polishing tool is presented with a continuum of crystal plane orientations, each with differing mechanical/thermal/chemical properties. These, in turn, are manifested as differential material removal rates (DMRR). FIG. 2 shows an example of DMRR in the case of an acid etching process which shows that the [112]-plane etches 33 times faster than the [111]-plane.

One of the underlying assumptions of current sub-aperture polishing processes is that the tool removal rate is constant over the entire optical surface. This assumption, however, is not valid for $CaF_2$ and other optical crystals. As an illustrative example, FIG. 3 shows the surface figure change observed from a nominally 200 nm uniform removal performed with a cerium-oxide slurry on both surfaces of a $CaF_2$ bi-convex spherical lens generated using a state-of-the-art sub-aperture figuring process. The optical surfaces span tilt angles ranging from 0°-21° and 0°-30° from the (111) plane for the R1 (left) and R2 (right) surfaces, respectively. The operating conditions of the polishing machine are preconfigured (hard wired) based on polishing calibrations performed on a flat piece of $CaF_2$ with the [111]-plane being presented to the sub-aperture polishing tool. Therefore, the polishing machine is configured to process the entire surface of the $CaF_2$ spherical lens using polishing conditions (material removal rates) established for the (111) crystallographic orientation of $CaF_2$ substrate. Because of the variation in material removal rate with crystallographic orientation over the spherical surfaces of the $CaF_2$ optic, the nominally uniform removal process removes approximately twice as much material from portions of the optical surface oriented such that the [112]-plane is presented to the polishing tool than from portions of the optical surface oriented such that the [111]-plane is presented to the polishing tool. Differences in removal rates relative to the (111) plane are also seen for planes other than the (112) plane. The difference in material removal rates creates the tri-lobed low areas in the post uniform removal figuring run surface figure error map shown in FIG. 3 (which was measured interferometrically). Material removal over the optical surface was far from the uniform removal anticipated from the pre-configured operating conditions of the polishing machine and predicted by the software algorithm used to control the polishing machine.

From the measured results presented in FIG. 3, one can calculate a DMRR map. FIG. 4 shows a $CaF_2$ DMRR map for surface R2 of FIG. 3. The calculated map was fitted with the first 36 Zernike polynomials to the inverse of the figure error data, as the low-areas in the figure error map corresponds to high-areas of material removal rates. The figure error map was converted into a material removal map by offsetting it by adding piston to it such that the total amount of material removed at the center is 200 nm (e.g., the [111]-plane location on the spherical surface). The DMRR map is then calculated by normalizing to 1 at the center of the part (e.g., divide each data point of the material removal map by 200 nm to obtain the ratio of material removal rate at each location on the lens surface with respect to the [111]-plane material removal rate).

None of the available sub-aperture solvers takes into consideration the impact DMRR has on the figuring process and the extent to which it can minimize or correct figure error.

Spherical elements with optical surfaces polished by conventional means have surface figure error dominated by trefoil. The trefoil is caused by DMRR that occurs during the conventional polishing process. The figure error of conventionally polished elements is not random but rather is highly correlated with the pattern of crystal structure orientations on the optical surface of the element. It is possible, by trial and error, to develop an ad-hoc modified sub-aperture figuring process for a narrow range of pre-determined surface figure errors of $CaF_2$ optics that require correction in a sub-aperture figuring process. The ad hoc process would assume figure error dominated by trefoil aligned with the crystal structure of the optics, a defined amount of uniform removal (UR) in the sub-aperture figuring process, and a particular polishing slurry. However, this ad-hoc process might fail if deviations from the narrowly defined conditions occur.

Methods for Accounting for DMRR

New methods are required that address the shortcomings of known sub-aperture figuring methods. In particular, sub-aperture figuring methods that account for DMRR are needed. The disclosure provides such methods.

A first method for compensating for crystal structures differential material removal rates in sub-aperture figuring comprises:

probing a substrate crystal fiducial, wherein the substrate comprises at least two different crystal planes to generate a first data set recording the crystal orientation structure of the optical substrate;
   generating
      substrate crystal structure orientation physical fiducial to generate a second data set; and
      a master substrate crystal differential removal map using a calibration piece made of the same material as the substrate to generate a third data set;
   determining local tilt angles from the optical surface mathematical description, hereafter called prescriptions to generate local tilt angles data for the optical surface;
   generating differential removal map data for the optical surface using the master crystal removal map data, the part fiducial information from data sets 1 and 2, and the local tilt angles data;
   generating crystal morphed spot data using the differential removal map data;
   generating a dwell map and CNC program using incoming metrology about the figure error that needs to be corrected on the optical surface, and
   performing a figuring run using the crystal morphed spot data,
      wherein the figuring run compensates for crystal structures differential material removal rates due to the presence of the at least two different crystal planes of the substrate.

The methods described herein can be applied to any sub-aperture figuring process that generates a dwell map as part of its mathematical calculations. Potential sub-aperture process applicability could be, and is not limited to QED Technologies MRF®, CCOS, Satisloh ADAPT, Zeeko Precession™, Optipro UFF, commercial IBF platforms software, Corning IBF proprietary software, laser polishing software, and the like.

Furthermore, the methods described herein can be applied to any other crystals, including $MgF_2$, and other non-isotropic optical substrates that can be characterized by a DMRR map over the optical surface to be figured.

The methods described herein address, among other things, the underlying assumption of spatially constant material removal rate by, among other things, modifying the tool influence function. The methods described herein can include a second round of spot morphing, hereafter called crystal spot morphing, based on the DMRR map of the sub-aperture process by performing at least one of a DMRR remapping calculation and probing operations necessary to be able to perform a crystal spot morphing operation.

The methods described herein may include a step of probing a substrate crystal fiducial, wherein the substrate comprises at least two different crystal planes to generate a first data set. The substrate crystal fiducial includes information relating to the clocking orientation of the substrate crystal structure. This can be done by any suitable means, usually X-ray diffraction. Next, a substrate crystal structure orientation physical fiducial is created to generate a second data set. A substrate crystal structure orientation physical fiducial could be the same as a metrology fiducial although this is not strictly necessary. But it can be helpful for the substrate crystal structure orientation fiducial to be the same as the metrology fiducial to avoid possible confusion with multiple fiducials on an optical element.

A substrate master crystal differential material removal rate map (e.g. FIG. 4) is also generated using a calibration piece made of the same material as the substrate (e.g., $CaF_2$ or $MgF_2$) to generate a third data set using known methods. Once a master crystal DMRR map has been obtained, it can be used for all subsequent figuring runs of optics made from the same substrate. It does not need to be redone for every figuring run.

Once the substrate crystal structure orientation fiducial and substrate master crystal differential removal map have been generated, one has the information necessary to determine, among other things, the location of the crystal planes on the optical surface from the prescriptions of the optical surface; the information necessary for determining local tilt angles from at least one substrate surface prescription to generate local tilt angles data; generating differential removal map data for the optical surface using the master crystal removal map data and the local tilt angles data; and generating crystal morphed spot data using the differential removal map data. Therefore, the geometrically morphed spot can be "crystal" morphed by multiplying it by the underlying DMRR map to arrive at the final crystal morphed spot at all locations of the optical surface. The crystal morphed spot describes how the polishing tool removes material at any given location on the optical surface.

With the crystal morphed spot data in hand, one can perform a figuring run using the crystal morphed spot data, wherein, e.g., the use of software, the figuring run compensates for crystal structures differential material removal rates due to the presence of the at least two different crystal planes of the substrate.

The generation of the substrate master crystal differential removal map can include generating a master map determined by polishing with uniform removal from a calibration substrate surface. In addition to generating the substrate master crystal differential removal map, one can match a clock on the master map and a clock on the substrate crystal orientation fiducial.

Since the methods described herein aim to, among other things, account for changes in material removal rates for different crystal planes in a substrate, the methods described herein compensate for material removal rate differences between the at least two crystal planes of at least 10%, or for material removal rate differences as low as 5% for higher precision sub-aperture figuring process.

The disclosure also relates to a second method for compensating for crystal structures differential material removal rates in sub-aperture figuring, the method comprising:

probing a substrate crystal fiducial, wherein the substrate comprises at least two different crystal planes to generate a first data set recording the crystal orientation structure of the optical substrate; generating a substrate crystal structure orientation physical fiducial to generate a second data set; and a substrate master crystal differential removal map using a calibration piece made of the same material as the substrate to generate a third data set;

determining local tilt angles from at least one substrate prescription to generate local tilt angles data for the optical surface;

generating surface differential removal map data for the optical surface using the master crystal removal map data and the local tilt angles data;

inputting original figure error map data into the sub-aperture solver and extracting resulting removal map data therefrom;

dividing the resulting removal map data by the surface DMRR map to obtain modified removal map data; generating new figuring error map data by subtracting piston value data or minimum value data from the modified removal map data to obtain a modified figure error map data;

regenerating a dwell map by submitting the modified figure error map data to the sub-aperture solver; and performing a figuring run using the regenerated dwell map and CNC figuring program, wherein the figuring run compensates for crystal structures differential material removal rates due to the presence of the at least two different crystal planes of the substrate.

In most cases (e.g., for $CaF_2$ and $MgF_2$), one can define the material removal rate as:

$$RR_c(x,y)=RR_{111}*f(x,y) \tag{1}$$

wherein $RR_{111}$ gives the removal rate for the 111-plane and f(x,y) is a DMRR map. The sub-aperture figuring process material removal rate is referenced to the material removal rate of 111-plane surface of a spot part. The method is not limited to using the 111-plane as the reference plane. Other planes can be selected as the reference plane, the tool influence function on the selected plane can be determined and the DMRR map can be referenced to the selected plane.

The original figure error map data is E(x,y). Furthermore, the amount of uniform removal in a sub-aperture figuring run, whether determined by a solver or fixed by the operator, is UR. The removal desired from a figuring machine is therefore given by:

$$R(x,y)=UR+E(x,y) \tag{2}$$

Since the solver of a standard sub-aperture figuring machine does not consider the DMRR from a substrate, it assumes a constant material removal rate $RR_{ref}$ (for reference which could be the 111-plane) over the entire optical surface when calculating a dwell map.

The solver calculated dwell is therefore given by:

$$D(x,y)=R(x,y)/RR_{ref} \tag{3}$$

A suitable dwell map is given by combining Equations 1, 2 and 3:

$$D_c(x,y)=R(x,y/RR_c(x,y)=R(x,y)/RR_{ref}*f(x,y))=(R(x,y)*$$
$$(1/f(x,y)/R_{ref}=R_c(x,y)/R_{ref}=(UR_c+E_c(x,y))/R_{ref} \tag{4}$$

where $R_c(x,y)$, $UR_c$, and $E_c(x,y)$ are modified total removal, modified uniform removal, and modified figure error maps respectively.

The numerator of equation 4 is a suitable removal map from a standard solver which does not take DMRR into consideration.

Regarding the second method described herein, the sub-aperture tool algorithm obtains an initial solution from which is extracted the resulting material removal map (D(x, y)).

The second method described herein, like the first method, includes a step of probing a substrate crystal fiducial, wherein the substrate comprises at least two different crystal planes to generate a first data set. The substrate crystal fiducial includes information relating to the clocking orientation of the substrate crystal structure. This can be done by any suitable means, usually X-ray diffraction. Next, a substrate crystal structure orientation physical fiducial is generated to generate a second data set. A substrate crystal structure orientation fiducial could be the same as a metrology fiducial although this is not strictly necessary. But it can be helpful for the substrate crystal structure orientation fiducial to be the same as the metrology fiducial to avoid possible confusion with multiple fiducials on an optical element.

A substrate crystal differential removal map is also generated using a calibration piece made of the same material as the substrate (e.g., $CaF_2$ or $MgF_2$) to generate a third data set using known methods. Once a master crystal DMMR map has been obtained, it can be used for all subsequent figuring runs of optics made from the same substrate. It does not need to be redone for every figuring runs.

Once the substrate crystal structure orientation fiducial has been generated, one has the information necessary to determine, among other things, the location of the crystal planes on the optical surface from the prescription of the optical surface; the information necessary for determining local tilt angles from at least one substrate prescription to generate local tilt angles data; generating a differential removal map data for the optical surface using the crystal removal map data and the local tilt angles data. Software can then be used to remap the master DMMR map onto the optical surface.

Therefore, it is possible to use the sub-aperture figuring software, consistent with the disclosure under the assumption of a constant material removal rate $R_{ref}$, to figure correct non-isotropic substrates, as follows:

1—Provide/input the original figure error map data into the solver and extract the resulting removal map data (R(x,y)=UR+E(x,y)).

2—Divide the removal map data (R(x,y)) by the DMRR (f(x,y)) map to obtain a modified total removal map data ($R_c(x,y)=UR_c+E_c(x,y)$).

3—Find the minimum value in the modified removal map ($UR_c$). That is the amount of UR that will be requested in the second iteration of the solver in step 5.

4—Subtract either the average value data or minimum value of the modified removal map ($R_c(x,y)$) from the modified removal map to obtain modified figure error map data ($E_c(x,y)$). Which option to select will depend on the particular of the sub-aperture tool polisher software algorithm.

5—Submit the modified figure error map data ($E_c(x,y)$) back into the solver while fixing the uniform removal to the $UR_c$ value determined in step 3.

Figure 6:
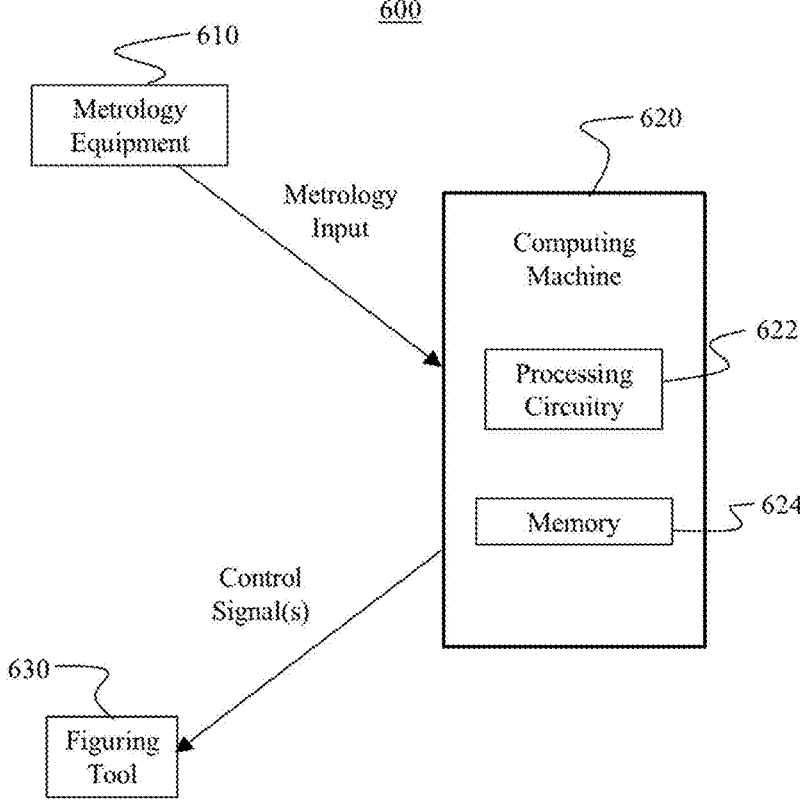
FIG. 6 is a block diagram of a system in which techniques for compensating for crystal structures differential material removal rates in sub-aperture figuring processes may be implemented, in accordance with some embodiments.

FIG. 6 is a block diagram of a system 600 in which techniques for compensating for crystal structures differential material removal rates in sub-aperture figuring processes may be implemented.

As shown, the system 600 includes metrology equipment(s) 610, a computing machine 620, and a figuring tool 630. In some cases, the metrology equipment(s) 610, the computing machine 620, and the figuring tool 630 reside within a single device and are hard wire connected to one another. In some cases, a wired or wireless connection or a network connection allows the computing machine 620 to communicate with the metrology equipment(s) 610 and/or the figuring tool 630. The wired connection may include one or more of a universal serial bus (USB) connection, an Ethernet connection, and the like. The wireless connection may include one or more of a WiFi® connection, a Bluetooth® connection, and the like. The network connection may include one or more of the Internet, an intranet, a local area network, a wide area network, a virtual private network, and the like.

The computing machine 620 includes processing circuitry 622 and a memory 624. The memory 624 stores data and/or instructions. The processing circuitry 622 executes the instructions stored in the memory 624. More details of the functioning and the components of one example of the computing machine 620 are described in conjunction with FIG. 11. However, it should be noted that, in some cases, the computing machine 620 might not include all the components shown in FIG. 11. The computing machine 620 may perform one or more of the methods described in FIGS. 7-10.

In some examples, the computing machine 620 receives, from the metrology equipment 610, a metrology input related to a substrate crystal. The metrology input may be generated using the metrology equipment 610, which are directed to the substrate crystal. The metrology input may be transmitted over a wire, wirelessly or over a network. The computing machine 620 generates, based on the metrology input, a surface map data structure for the substrate crystal. The computing machine 620 generates, based on the surface map data structure, a figuring route data structure for the figuring tool 630 to figure the substrate crystal. The surface map data structure and the figuring route data structure may be stored in the memory 624. The computing machine 620 controls, by transmitting one or more control signals, the figuring tool 630 to figure the substrate crystal based on the figuring route data structure. The control signals may be transmitted over a wire, wirelessly or over a network. The metrology equipment 610 may be one of multiple input devices to the computing machine 620. For example, the computing machine 620 may receive input from probing, a fiducial camera, an alignment camera, and the like.

Figure 7:
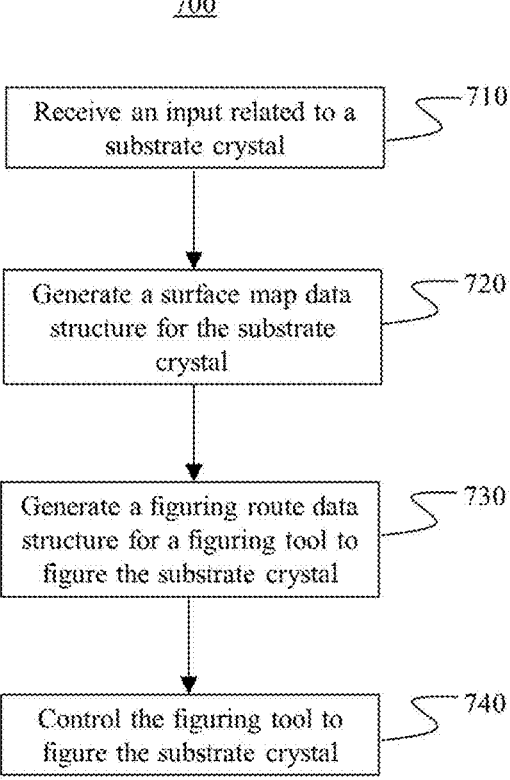
FIG. 7 is a flow chart of a first method for compensating for crystal structures differential material removal rates in sub-aperture figuring processes, in accordance with some embodiments.

FIG. 7 is a flow chart of a method 700 for compensating for crystal planes differential material removal rates in sub-aperture figuring processes, in accordance with some embodiments. The method 700 may be performed by the computing machine 620 or another computing machine.

At operation 710, the computing machine receives (e.g., from metrology equipment) an input (e.g., a metrology input that identifies, or may be used to identify, where the optical surface is located in the polishing machine) related to a substrate crystal (e.g. crystal fiducial from X-ray diffraction, LVDT or non-contact probing of optical surface, camera imaging the optic). The substrate crystal may include, for example, one or more of $CaF_2$ and $MgF_2$.

At operation 720, the computing machine generates, based on the input, a surface map data structure for the substrate crystal: master crystal DMRR map and substrate DMRR map ($f(x,y)$).

At operation 730, the computing machine generates, based on the surface map data structure, a figuring route data structure for a figuring tool to figure the substrate crystal. The figuring route is a pathway traversed by the figuring tool across the surface during the figuring process. The figuring route data structure is derived from the dwell map and is the set of computer numerical control (CNC) commands sent to the polishing machine for execution.

The surface map data structure and/or the figuring route data structure may be stored in the memory of the computing machine. In some cases, the surface map data structure is a three-dimensional mapping data structure. In some cases, the figuring route data structure is a data structure for representing a path on a map.

In some examples, the substrate crystal comprises at least two different crystal planes, each crystal plane having a different rate of material removal. The figuring route data structure is generated by performing a figuring solve using the surface map data structure to calculate one or more compensation factors and a predicted figure error. The figuring route data structure compensates for crystal structures differential material removal rates due to the presence of the at least two different crystal planes of the substrate crystal. To generate the surface map data structure, the computing machine identifies the (two or more) differential crystal planes, identifies surface prescription(s) in the input, and determines one or more local tilt angles based on the surface prescription.

In some cases, the input comprises imagery from at least two sensor positions (e.g. two sensor positions). The different sensor positions may be reached by using two or more sensors at different positions, by moving sensor(s) between positions, or by moving the substrate crystal. The surface map data structure includes a three-dimensional model of the substrate crystal generated based on information representing the sensor positions. The information representing the sensor positions is stored in the memory of the computing machine.

At operation 740, the computing machine controls, using the processing circuitry and based on the figuring route data structure, the figuring tool to figure the substrate crystal. In some embodiments, the computing machine computes, based on at least the surface map data structure or the figuring route data structure, a differential rate of removal for the figuring tool to figure the substrate crystal. The figuring tool is controlled based on the differential rate of removal. The controls can be those inherent to the polishing machine, where the operator only changes the CNC commands to the polishing machine. But the polishing action can remain unchanged. One factor that can change is the details of the velocities of the figuring run route to account for DMRR.

Figure 8:
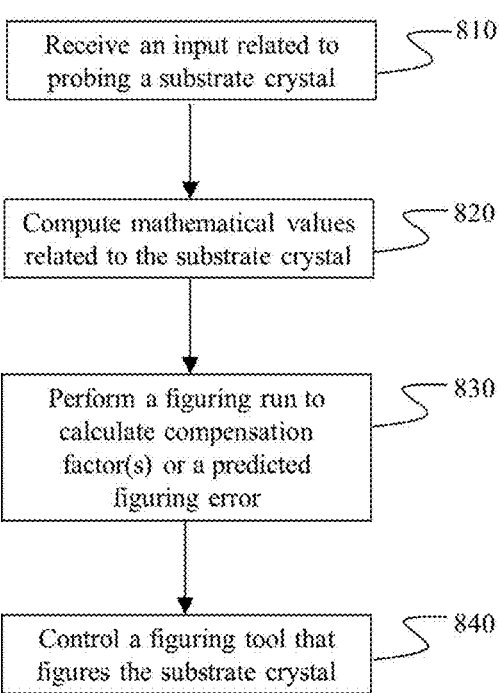
FIG. 8 is a flow chart of a second method for compensating for crystal structures differential material removal rates in sub-aperture figuring processes, in accordance with some embodiments.

FIG. 8 is a flow chart of a method 800 for compensating for crystal structure differential material removal rates in sub-aperture figuring processes, in accordance with some embodiments. The method 800 may be performed by the computing machine 620 or another computing machine.

At operation 810, the computing machine receives an input related to probing a substrate crystal for storage in the memory of the computing machine. The substrate comprises at least two different crystal planes.

At operation 820, the computing machine, computes, based on the input, a plurality of mathematical values (DMRR map, $UR_c$, $E_c$) related to the substrate.

At operation 830, the computing machine performs a figuring run using the computed plurality of mathematical values related to the substrate to calculate one or more compensation factors and a predicted figure error. The figuring run compensates for crystal structures differential material removal rates due to the presence of the at least two different crystal planes of the substrate.

At operation 840, the computing machine controls, based on the one or more compensation factors or the predicted figure error, a figuring tool that figures the substrate. For example, the computing machine may send control signal(s) to the figuring tool.

Figure 9:
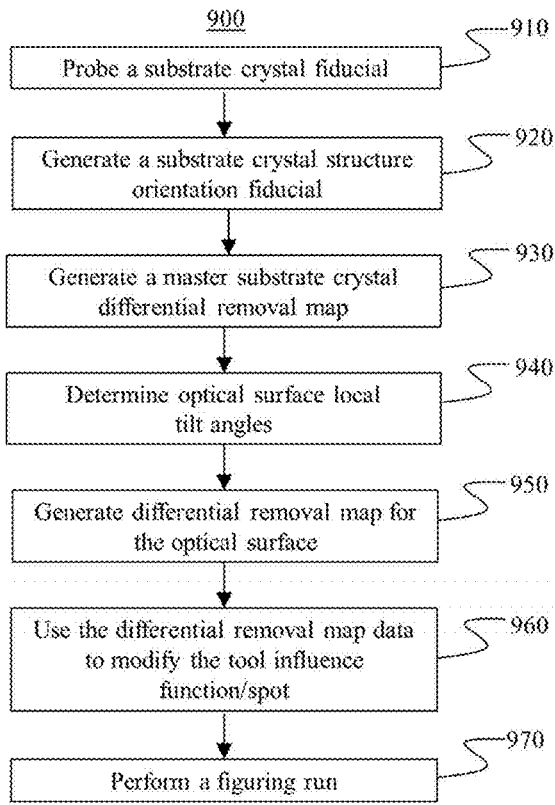
FIG. 9 is a flow chart of a third method for compensating for crystal structures differential material removal rates in sub-aperture figuring processes, in accordance with some embodiments.

FIG. 9 is a flow chart of a method 900 for compensating for crystal structures differential material removal rates in sub-aperture figuring processes, in accordance with some embodiments. The method 900 may be performed by the computing machine 620 or another computing machine.

At operation 910, the computing machine probes a substrate crystal fiducial. The substrate comprises at least two different crystal planes to generate a first data set. The substrate may include, for example, $CaF_2$ and $MgF_2$.

At operation 920, the computing machine generates a substrate crystal structure orientation fiducial to generate a second data set.

At operation 930, the computing machine generates a master substrate crystal differential removal map using a calibration piece made of the same material as the substrate to generate a third data set.

At operation 940, the computing machine determines optical surface local tilt angles, for example, from optical surface prescription to generate local tilt angles data.

At operation 950, the computing machine generates differential removal map data for the optical surface using the master crystal removal map data and the local tilt angles data.

At operation 960, the computing machine uses the differential removal map data to modify tool influence function/spot creating the crystal morphed spot data.

At operation 970, the computing machine performs a figuring run using the crystal morphed spot data from the output of step 960. The figuring run compensates for crystal structure differential material removal rates due to the presence of the at least two different crystal planes of the substrate.

In some embodiments, the generation of the substrate crystal differential removal map includes generating a master map determined by using a uniform removal from the substrate surface. In some embodiments, the computing machine matches a clock on the master map and a clock on the substrate crystal orientation fiducial.

In some cases, the material removal rate between the at least two crystal planes of the substrate differs by more than 10%. In some cases, the variation in material removal rate between the at least two crystal planes of the substrate can be as low than a predefined value (e.g., 5%).

FIG. 10 is a flow chart of a method for compensating for crystal structures differential material removal rates in sub-aperture figuring processes, in accordance with some embodiments. The method 1000 may be performed by the computing machine 620 or another computing machine.

At operation 1005, the computing machine probes a substrate crystal fiducial. The substrate comprises at least two different crystal planes to generate a first data set.

At operation 1010, the computing machine generates a substrate crystal structure orientation fiducial to generate a second data set.

At operation 1015, the computing machine generates a master substrate crystal differential removal map using a calibration piece made of the same material as the substrate to generate a third data set.

At operation 1020, the computing machine determines optical surface local tilt angles from at least one substrate prescription to generate local tilt angles data.

At operation 1025, the computing machine generates differential removal map data for the optical surface using the master crystal removal map data and the local tilt angles data.

At operation 1030, the computing machine inputs original figure error map data into the solver software and extracts resulting removal map data therefrom.

At operation 1035, the computing machine divides the resulting removal map data by the generated differential removal map data for the optical surface (e.g., from operation 1025) to obtain modified removal map data.

At operation 1040, the computing machine generates new figuring error map data by subtracting piston value data or minimum value data from the modified removal map data to obtain a modified figure error map data.

At operation 1045, the computing machine regenerates a dwell map from modified figure error map data.

At operation 1050, the computing machine performs a figuring run using the regenerated dwell map. The figuring run compensates for crystal structures differential material removal rates due to the presence of the at least two different crystal planes of the substrate.

Figure 11:
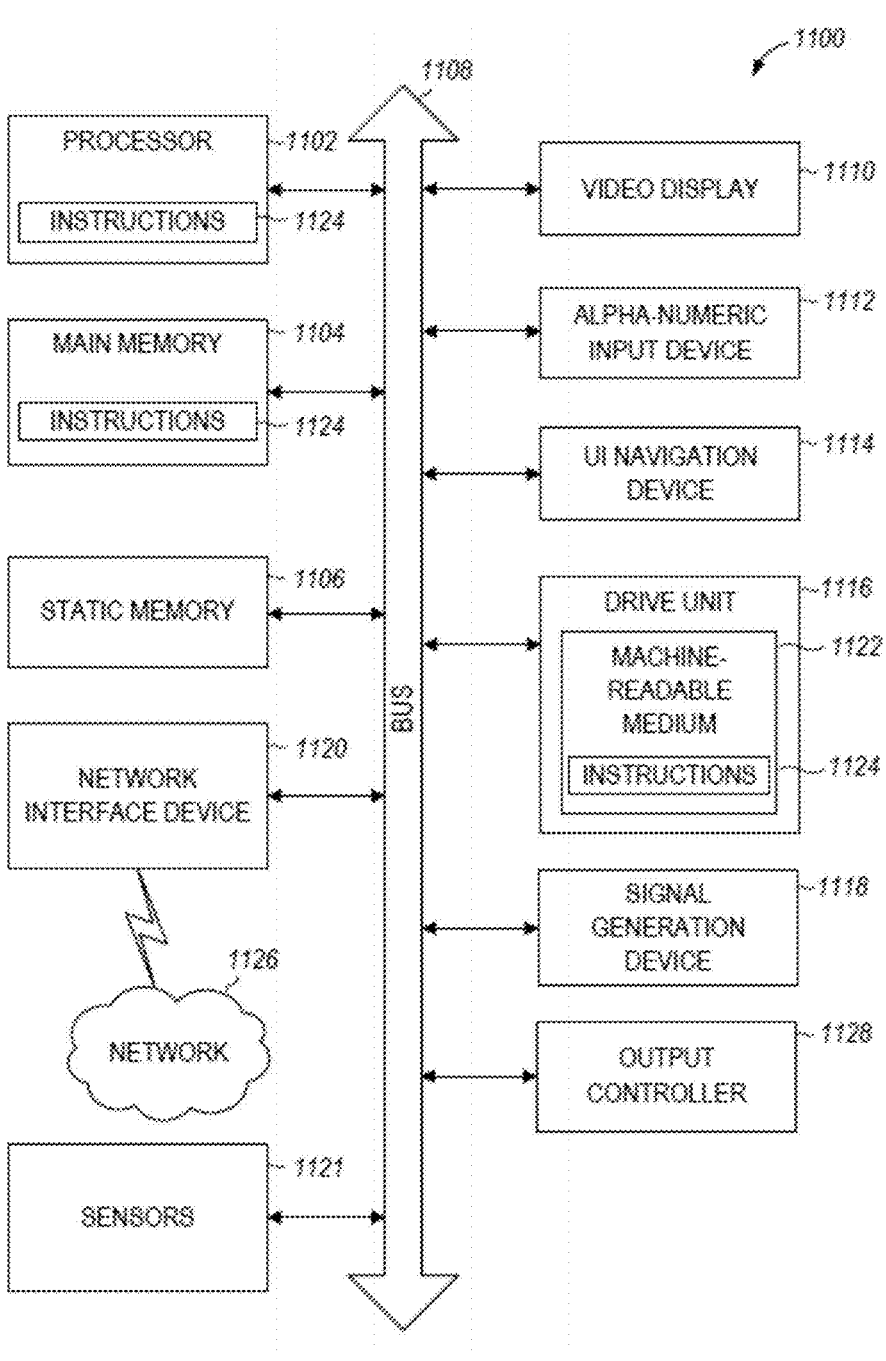
FIG. 11 is a block diagram of a computing machine, in accordance with some embodiments.

FIG. 11 illustrates a circuit block diagram of a computing machine 1100 in accordance with some embodiments. In some embodiments, components of the computing machine 1100 may store or be integrated into other components shown in the circuit block diagram of FIG. 11. The computing machine 1100 may correspond to the computing machine 620 of FIG. 6. For example, portions of the computing machine 1100 may reside in the processor 1102 and may be referred to as "processing circuitry." Processing circuitry may include processing hardware, for example, one or more central processing units (CPUs), one or more graphics processing units (GPUs), and the like. In alternative embodiments, the computing machine 1100 may operate as a standalone device or may be connected (e.g., networked) to other computers. In a networked deployment, the computing machine 1100 may operate in the capacity of a server, a client, or both in server-client network environments. In an example, the computing machine 1100 may act as a peer machine in peer-to-peer (P2P) (or other distributed) network environment. In this document, the phrases P2P, device-to-device (D2D) and sidelink may be used interchangeably.

The computing machine 1100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 1100 may include a hardware processor 1102 (e.g., a central processing unit (CPU), a GPU, a hardware processor core, or any combination thereof), a main memory 1104 and a static memory 1106, some or all of which may communicate with each other via an interlink (e.g., bus) 1108. Although not shown, the main memory 1104 may contain any or all removable storage and non-removable storage, volatile memory or non-volatile memory. The computing machine 1100 may further include a video display unit 1110 (or other display unit), an alpha-numeric input device 1112 (e.g., a keyboard), and a user interface (UI) navigation device 1114 (e.g., a mouse). In an example, the display unit 1110, input device 1112 and UI navigation device 1114 may be a touch screen display. The computing machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The computing machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 1116 (e.g., a storage device) may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the computing machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the computing machine 1100 and that cause the computing machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Some aspects describe certain method operations as being performed in a given order or in series. However, unless specified otherwise, the method operations may be performed in any order and two or more operations may be performed in parallel. In some cases, some of the operation(s) of the method(s) may be skipped and/or replaced with other operation(s). In some cases, additional operation(s) may be added to one or more of the method(s) disclosed herein.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The present disclosure provides for the following numbered examples (Example 1, 2, 3, etc.), the numbering of which is not to be construed as designating levels of importance. The numbered examples describe example implementations and do not limit the technology disclosed herein.

Example 1 is a method comprising: receiving, at a computing machine comprising processing circuitry and memory, an input related to a substrate crystal; generating, based on the input, a surface map data structure for the substrate crystal structure; generating, based on the surface map data structure, a figuring route data structure for a figuring tool to figure the substrate crystal; controlling, using the processing circuitry and based on the figuring route data structure, the figuring tool to figure the substrate crystal.

In Example 2, the subject matter of Example 1 includes, wherein the substrate crystal comprises at least two different crystal planes, each crystal plane having a different rate of material removal.

In Example 3, the subject matter of Example 2 includes, wherein generating the figuring route data structure comprises: performing a figuring run using the surface map data structure to calculate one or more compensation factors or a predicted figure error, wherein the figuring route data structure compensates for crystal structures differential material removal rates due to the presence of the at least two different crystal planes of the substrate crystal.

In Example 4, the subject matter of Examples 2-3 includes, wherein generating the surface map data structure comprises: identifying the at least two differential crystal planes; identifying optical surface prescription in the input; and determining one or more local tilt angles based on optical surface prescription.

In Example 5, the subject matter of Examples 1-4 includes, wherein the input comprises imagery from at least two sensor positions, and wherein the surface map data structure comprises a three-dimensional model of the substrate crystal generated based on information representing the at least two sensor positions, the information representing the at least two sensor positions being stored in the memory.

In Example 6, the subject matter of Examples 1-5 includes, computing, based on at least the surface map data structure or the figuring route data structure, a differential rate of removal for the figuring tool to figure the substrate crystal, wherein the figuring tool is controlled based on the differential rate of removal.

In Example 7, the subject matter of Examples 1-6 includes, wherein the substrate crystal comprises $CaF_2$ and $MgF_2$.

In Example 8, the subject matter of Examples 1-7 includes, storing, in the memory, the surface map data structure, wherein the surface map data structure is a three-dimensional mapping data structure; and storing, in the memory, the figuring route data structure, wherein the figuring route data structure is a data structure for representing a path on a map.

Example 9 is a system comprising: processing circuitry; and memory storing instructions which, when executed by the processing circuitry, cause the processing circuitry to perform operations comprising: receiving an input related to a substrate crystal; generating, based on the input, a surface map data structure for the substrate crystal; generating, based on the surface map data structure, a figuring route data structure for a figuring tool to figure the substrate crystal; controlling, based on the figuring route data structure, the figuring tool to figure the substrate crystal.

In Example 10, the subject matter of Example 9 includes, two or more sensors, wherein the input is received from the two or more sensors.

In Example 11, the subject matter of Examples 9-10 includes, the figuring tool.

In Example 12, the subject matter of Examples 9-11 includes, wherein the substrate crystal comprises at least two different crystal planes, each crystal plane having a different rate of material removal.

In Example 13, the subject matter of Example 12 includes, wherein generating the figuring route data structure comprises: performing a figuring run using the surface map data structure to calculate one or more compensation factors or a predicted figure error, wherein the figuring route data structure compensates for crystal structures differential material removal rates due to the presence of the at least two different crystal planes of the substrate crystal.

In Example 14, the subject matter of Examples 12-13 includes, wherein generating the surface map data structure comprises: identifying the at least two differential crystal planes; identifying optical surface prescription in the input; and determining one or more local tilt angles based on optical surface prescription.

In Example 15, the subject matter of Examples 9-14 includes, wherein the input comprises imagery from at least two sensor positions, and wherein the surface map data structure comprises a three-dimensional model of the substrate crystal generated based on information representing the at least two sensor positions, the information representing the at least two sensor positions being stored in the memory.

In Example 16, the subject matter of Examples 9-15 includes, the operations further comprising: computing, based on at least the surface map data structure or the figuring route data structure, a differential rate of removal for the figuring tool to figure the substrate crystal, wherein the figuring tool is controlled based on the differential rate of removal.

Example 17 is a non-transitory machine-readable medium storing instructions which, when executed by a computing machine, cause the computing machine to perform operations comprising: receiving an input related to a substrate crystal; generating, based on the input, a surface map data structure for the substrate crystal; generating, based on the surface map data structure, a figuring route data structure for a figuring tool to figure the substrate crystal; controlling, based on the figuring route data structure, the figuring tool to figure the substrate crystal.

In Example 18, the subject matter of Example 17 includes, wherein the substrate crystal comprises at least two different crystal planes, each crystal plane having a different rate of material removal.

In Example 19, the subject matter of Example 18 includes, wherein generating the figuring route data structure comprises: performing a figuring run using the surface map data structure to calculate one or more compensation factors or a predicted figure error, wherein the figuring route data structure compensates for crystal structures differential material removal rates due to the presence of the at least two different crystal planes of the substrate crystal.

In Example 20, the subject matter of Examples 18-19 includes, wherein generating the surface map data structure comprises: identifying the at least two differential crystal planes; identifying optical surface prescription in the input; and determining one or more local tilt angles based on optical surface prescription.

Example 21 is a method, implemented at a computing machine comprising processing circuitry and memory, for compensating for crystal structures differential material removal rates in sub-aperture figuring, the method comprising: receiving, at the computing machine, an input related to probing a substrate crystal for storage in the memory, wherein the substrate comprises at least two different crystal planes; computing, based on the input, a plurality of mathematical values related to the substrate; performing a figuring run using the computed plurality of mathematical values related to the substrate to calculate one or more compensation factors or a predicted figure error, wherein the figuring run compensates for crystal structures differential material removal rates due to the presence of the at least two different crystal planes of the substrate; and controlling, using the computing machine and based on the one or more compensation factors or the predicted figure error, a figuring tool that figures the substrate.

Example 22 is a method for compensating for crystal structures differential material removal rates in sub-aperture figuring, the method comprising: probing a substrate crystal fiducial, wherein the substrate comprises at least two different crystal planes to generate a first data set; generating a substrate crystal structure orientation fiducial to generate a second data set; generating a substrate crystal differential removal map using a calibration piece made of the same material as the substrate to generate a third data set; generating a master crystal removal map data using the first, second, and third data sets; determining local tilt angles from the optical surface prescription to generate local tilt angles data; generating differential removal map data for the optical surface using the master crystal removal map data and the local tilt angles data; generating crystal morphed spot data using the differential removal map data; and performing a figuring run using the crystal morphed spot data, wherein the figuring run compensates for crystal structures differential material removal rates due to the presence of the at least two different crystal planes of the substrate.

In Example 23, the subject matter of Example 22 includes, wherein the generating of the substrate crystal differential removal map comprises generating a master map determined by polishing a uniform removal from the substrate calibration surface.

In Example 24, the subject matter of Example 23 includes, matching a clock on the master map and a clock on the substrate crystal orientation fiducial.

In Example 25, the subject matter of Examples 22-24 includes, wherein the material removal rate difference between the at least two crystal planes of the substrate is more than 10%.

In Example 26, the subject matter of Examples 22-25 includes, wherein the variation in material removal rate between the at least two crystal planes of the substrate is more than 5%.

In Example 27, the subject matter of Examples 22-26 includes, wherein the substrate comprises $CaF_2$ and $MgF_2$.

Example 28 is a method for compensating for crystal structures differential material removal rates in sub-aperture figuring, the method comprising: probing a substrate crystal fiducial, wherein the substrate comprises at least two different crystal planes to generate a first data set; generating a substrate crystal structure orientation fiducial to generate a second data set; generating a master substrate crystal differential removal map using a calibration piece made of the same material as the substrate to generate a third data set; determining local tilt angles from optical surface prescription to generate local tilt angles data; generating differential removal map data for the optical surface using the crystal removal map data and the local tilt angles data; inputting original figure error map data and extracting resulting removal map data therefrom; dividing the resulting removal map data by the differential material removal map to obtain modified removal map data; generating new figuring error map data by subtracting piston value data or minimum value data from the modified removal map data to obtain a modified figure error map data; regenerating a dwell map from modified figure error map data; and performing a figuring run using the regenerated dwell map, wherein the figuring run compensates for crystal structures differential material removal rates due to the presence of the at least two different crystal planes of the substrate.

In Example 29, the subject matter of Example 28 includes, wherein the generating of the substrate crystal differential removal map comprises generating a master map determined by polishing a uniform removal from the substrate calibration surface.

In Example 30, the subject matter of Example 29 includes, matching a clock on the master map and a clock on the substrate crystal orientation fiducial.

In Example 31, the subject matter of Examples 28-30 includes, wherein the material removal rate difference between the at least two crystal planes of the substrate is more than 10%.

In Example 32, the subject matter of Examples 28-31 includes, wherein the variation in material removal rate between the at least two crystal planes of the substrate is more than 5%.

In Example 33, the subject matter of Examples 28-32 includes, wherein the substrate comprises $CaF_2$ and $MgF_2$.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

What is claimed is:

1. A method comprising:
receiving, at a computing machine comprising processing circuitry and memory, an input related to a substrate crystal wherein the computing machine generates a first data set based on the input, wherein the input comprises imagery from at least two sensor positions, and wherein a surface map data structure comprises a three-dimensional model of the substrate crystal generated based on information representing the at least two sensor positions, the information representing the at least two sensor positions being stored in the memory;
generating with the computing machine, based on the input, the surface map data structure for the substrate crystal and a second data set based on the surface map data structure, wherein generating the surface map data structure comprises:
identifying, with the computing machine, at least two different crystal planes of the substrate crystal;
identifying, with the computing machine, an optical surface prescription in the input; and
determining one or more local tilt angles based on the optical surface prescription;
generating with the computing machine, based on the surface map data structure, a figuring route data structure for a figuring tool to figure the substrate crystal, wherein the figuring route data structure comprises a third data set, wherein the figuring route data structure compensates for crystal structure differential material removal rate due to the presence of the at least two different crystal planes of the substrate crystal; and
controlling, using the processing circuitry and based on the figuring route data structure, the figuring tool to figure the substrate crystal.

2. The method of claim 1, wherein generating the figuring route data structure further comprises:
performing a figuring run on a reference substrate, made of a same material as the substrate crystal, using the surface map data structure to calculate one or more compensation factors or a predicted figure error to generate the third data set, wherein the figuring route data structure compensates for the crystal structure differential material removal rates due to the presence of the at least two different crystal planes of the substrate crystal.

3. The method of claim 1, further comprising:
computing, based on at least the surface map data structure or the figuring route data structure, a differential rate of removal for the figuring tool to figure the substrate crystal, wherein the figuring tool is controlled based on the differential rate of removal.

4. The method of claim 1, wherein the substrate crystal comprises $CaF_2$ or $MgF_2$.

5. The method of claim 1, further comprising:

storing, in the memory, the surface map data structure, wherein the surface map data structure is a three-dimensional mapping data structure; and storing, in the memory, the figuring route data structure, wherein the figuring route data structure is a data structure for representing a path on a map.

6. A system comprising:

processing circuitry; and memory storing instructions which, when executed by the processing circuitry, cause the processing circuitry to perform operations comprising:

receiving an input related to a substrate crystal that comprises at least two different crystal planes, each of the at least two different crystal planes having a different rate of material removal, wherein the input comprises imagery from at least two sensor positions;

generating, based on the input, a surface map data structure for the substrate crystal, wherein the surface map data structure comprises a three-dimensional model of the substrate crystal generated based on information representing the at least two sensor positions, wherein generating the surface map data structure comprises:

identifying the at least two different crystal planes;

identifying an optical surface prescription in the input; and determining one or more local tilt angles based on the optical surface prescription;

generating, based on the surface map data structure, a figuring route data structure for a figuring tool to figure the substrate crystal; and controlling, based on the figuring route data structure, the figuring tool to figure the substrate crystal;

wherein the figuring route data structure compensates for crystal structure differential material removal rates due to the presence of the at least two different crystal planes of the substrate crystal.

7. The system of claim 6, further comprising:

two or more sensors, wherein the input is received from the two or more sensors.

8. The system of claim 4, wherein the information representing the at least two sensor positions is stored in the memory.

9. A system comprising:

processing circuitry; and memory storing instructions which, when executed by the processing circuitry, cause the processing circuitry to perform operations comprising:

receiving an input related to a substrate crystal that comprises at least two different crystal planes, wherein the input comprises imagery from at least two sensor positions;

generating, based on the input, a surface map data structure for the substrate crystal, wherein the surface map data structure comprises a three-dimensional model of the substrate crystal generated based on information representing the at least two sensor positions, wherein generating the surface map data structure comprises:

identifying the at least two different crystal planes;

identifying an optical surface prescription in the input; and determining one or more local tilt angles based on the optical surface prescription;

generating, based on the surface map data structure, a figuring route data structure for a figuring tool to figure the substrate crystal;

controlling, based on the figuring route data structure, the figuring tool to figure the substrate crystal; and computing, based on at least the surface map data structure or the figuring route data structure, a differential rate of removal for the figuring tool to figure the substrate crystal, wherein the figuring tool is controlled based on the differential rate of removal.

\* \* \* \* \*